US011822465B2

(12) United States Patent
Raiskup et al.

(10) Patent No.: US 11,822,465 B2
(45) Date of Patent: Nov. 21, 2023

(54) OPERATIONAL MULTIPLIERS FOR HETEROGENEOUS BUILD ARCHITECTURES (71) Applicant: RED HAT, INC., Raleigh, NC (US)

(72) Inventors: Pavel Raiskup, Brno (CZ); Miroslav Hrončok, Cernuc-Bratkovice (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/546,878

(22) Filed: Dec. 9, 2021

(65) Prior Publication Data
US 2023/0185699 A1 Jun. 15, 2023

(51) Int. Cl.
G06F 9/44 (2018.01)
G06F 11/36 (2006.01)

(52) U.S. Cl.
CPC ...... *G06F 11/3688* (2013.01); *G06F 11/3612* (2013.01)

(58) Field of Classification Search
CPC .......................... G06F 11/3688; G06F 11/3612
See application file for complete search history.

(56) References Cited

U.S. PATENT DOCUMENTS

| | | | |
|---|---|---|---|
| 7,376,549 B2 | 5/2008 | Horikawa | |
| 7,694,107 B2 | 4/2010 | Lin et al. | |
| 8,676,530 B2 | 3/2014 | Roth et al. | |
| 9,491,161 B2 | 11/2016 | Suresh et al. | |
| 10,379,887 B2 | 8/2019 | Spracklen | |
| 11,126,473 B2 | 9/2021 | He et al. | |
| 2004/0194060 A1* | 9/2004 | Ousterhout | G06F 9/5072 714/E11.2 |
| 2006/0212857 A1* | 9/2006 | Neumann | G06F 8/20 717/140 |
| 2019/0220703 A1 | 7/2019 | Prakash et al. | |

OTHER PUBLICATIONS

Zaharia, M. et al. "Improving MapReduce Performance in Heterogeneous Environments," Dec. 8, 2008, University of California, Berkeley, pp. 14.
"Define_platform_multiplier macro" rpm-software-management/mock, May 20, 2021, pp. 6.
"Let-forcearch builds define %_mock_forcearch" rpm-software-management/mock, Feb. 1, 2021, pp. 3.
"RFE: Use %_platform_multiplier" rpm-software-management/mock, Jun. 14, 2021, pp. 3.
Daniel P. Berrangé, "TTest timeouts in Fedora Copr emulated envs," Jan. 29, 2021, pp. 7.

* cited by examiner

*Primary Examiner* — Hang Pan
(74) *Attorney, Agent, or Firm* — Womble Bond Dickinson (US) LLP (57) ABSTRACT

Methods, systems, and computer program products provide a build system that may automatically adjust to changes in the performance of a build operation. According to some embodiments, a multiplier is determined for a build system. The multiplier may be associated with a performance of the build system. A duration associated with a build operation performed by the build system is adjusted in view of the multiplier.

14 Claims, 5 Drawing Sheets

DETERMINE A MULTIPLIER FOR A BUILD SYSTEM OF A BUILD PLATFORM, THE MULTIPLIER ASSOCIATED WITH A PERFORMANCE OF THE BUILD SYSTEM
410

ADJUST A DURATION ASSOCIATED WITH A BUILD OPERATION PERFORMED BY THE BUILD SYSTEM IN VIEW OF THE MULTIPLIER
420

OPERATIONAL MULTIPLIERS FOR HETEROGENEOUS BUILD ARCHITECTURES

TECHNICAL FIELD

Aspects of the present disclosure relate to build operations, and more particularly, to build operations involving heterogeneous computer architectures.

BACKGROUND

Computer applications are typically deployed as an executable program that may be loaded and executed by a processing device. The processing device itself may be based on a particular hardware configuration. There are multiple hardware configurations that are currently utilized for processing devices, and new architectures are in development. In many cases, executable programs that are intended to run natively on a particular architecture are first developed as source code. In some cases, the source code may be independent (or less dependent) on the underlying hardware architecture on which the source code is to ultimately execute. The source code may then be compiled, which may generate an executable program that is compatible with a particular processing device architecture. Thus, the same program source code may generate executable programs compatible with multiple processing device architectures by using different compilers for different architectures (or the same compiler given configurations specific to a particular architecture).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the scope of the described embodiments.

DETAILED DESCRIPTION

The increased use of personal computers, tablets, mobile devices, and internet-of-things (IoT) devices has resulted in a wide variety of processing device architectures. Processor architectures that may be sufficient for a personal computer, for example, may be too power intensive for a mobile device. Similarly, a processing architecture that is sufficient for a mobile device may not have the right types of input/output capabilities (or too many of said capabilities) for an IoT device which may have specialized and/or limited requirements for power, thermal, space, cost, etc. As used herein, the term "and/or" includes any and all combinations of one or more of the associated listed items.

The different processing device architectures that have been developed to cater to the various computing environments has been challenging for software developers. To develop a particular software package that can appeal to a large number of potential users, a number of different processing device architectures may need to be supported. Each processing device variation may utilize a different compiler and compile option. To support ten different processing device architectures, for example, ten different compiles may need to be done on the same source code.

The problem extends beyond mere compilation, however. Once a program executable is compiled for source code, it is often tested before the program executable. In modern software development, continuous development and delivery processes have become more popular, resulting in software providers building, testing, and releasing software and new versions of their software faster and more frequently. Some enterprises release, patch, or otherwise modify software code dozens of times per week. As updates to software and new software are developed, testing of the software can involve coordinating the deployment across multiple machines in the test environment. For example, a test platform for a program executable may perform an automatic build to generate a program executable, and subsequently perform an automatic test of the program executable to verify that the automatic build was successful. Such test platforms strive to improve user convenience, build reproducibility, performance, target platform simulation, and scalability. As used herein, a "build" as performed by a "build system" is not intended to be limited to just the compilation of a program executable. The build may also include testing or other provisioning of the program executable. In some embodiments, the build may exclude the compile, working instead with pre-compiled program executables. As used herein, a "system" refers to a physical electronic device or a virtual instance of an electronic device that is executing on a physical electronic device.

For example, for a scalable build system, it is useful to be able to add build environments for new architectures as needed. To achieve a scalable build system, it would be expensive to guarantee a homogeneous machine build environment, where every system used as part of the build operation has the same underlying configuration. Instead, new machines to perform compilations and testing are iteratively added and retired according to the actual needs of the build system.

This may bring inconvenience to the build system end-user (e.g., a software contributor), as machines assigned to the build tasks may be randomly selected, bringing different performance to the build. For example, a first time a program executable is tested may occur on a first system that has a relatively robust processing device (e.g., fast, multiple cores) and relatively fast memory, and the second time the program executable is tested may occur on a second system that has a slower processing device and slower memory. Since the build environment may be inaccessible and/or isolated (e.g., users cannot control or measure the build process from the outside), it may be difficult to estimate the system performance to setup build-time constraints like time or resource consumption for particular build tasks (e.g., setting the maximum time for testing how fast a cryptographic handshake is performed between a client and server). This can lead to false failures for timeouts due to slower machines, or builds that take longer than necessary, because a build maintainer may have to otherwise set timeouts inordinately high to account for any possible build architecture that may be used.

Aspects of the present disclosure address the above-noted and other deficiencies by introducing various multipliers that may be utilized during the build process to reflect differences in underlying build architectures. Aspects of the disclosure described herein may provide itemized multipliers that may distinguish between reference systems providing a "standard" level of build functionality, "inferior" systems providing a level of build functionality that is below (e.g., slower) that of the reference system, and "superior" systems providing a level of build functionality that is above (e.g., faster) that of the reference system. The multipliers may be used adjust operations within the build system to reflect, and adjust for, the underlying hardware being used as part of the build system. For example, a multiple may increase (or decrease) a timeout during a particular test to reflect the fact that the test may execute slower (or faster) due to slower (or faster) hardware executing the test. This may avoid a false error that might otherwise interrupt the test process.

In some embodiments, one or more multipliers may include an overall multiplier for the build system and/or granular multipliers for various subsystems of the build system. For example, in some embodiments, separate multipliers for the processor, memory, input/output (I/O) system, and/or networking may be provided along with, or as an alternative to, an overall platform multiplier.

Embodiments of the disclosure describe an improved build system by providing the ability to dynamically (e.g., automatically and/or without additional user intervention) adjust the technical operations of the build environment. The use of the various multipliers may allow users of the build system (e.g., a software contributor and/or test developer) to fine-tune their build and test infrastructure to adjust for variations in the underlying hardware. The embodiments of the present disclosure thus provide a technical improvement that dynamically adjusts to the capability of the build machines. Embodiments of the present disclosure may reduce false errors in the test and/or compile process and lead to a more accurate and customizable build environment. The ability to automatically accommodate different types of machines may further increase the types of machines that can be utilized in a build system, reducing the cost and complexity of the build system even further.

Figure 1:
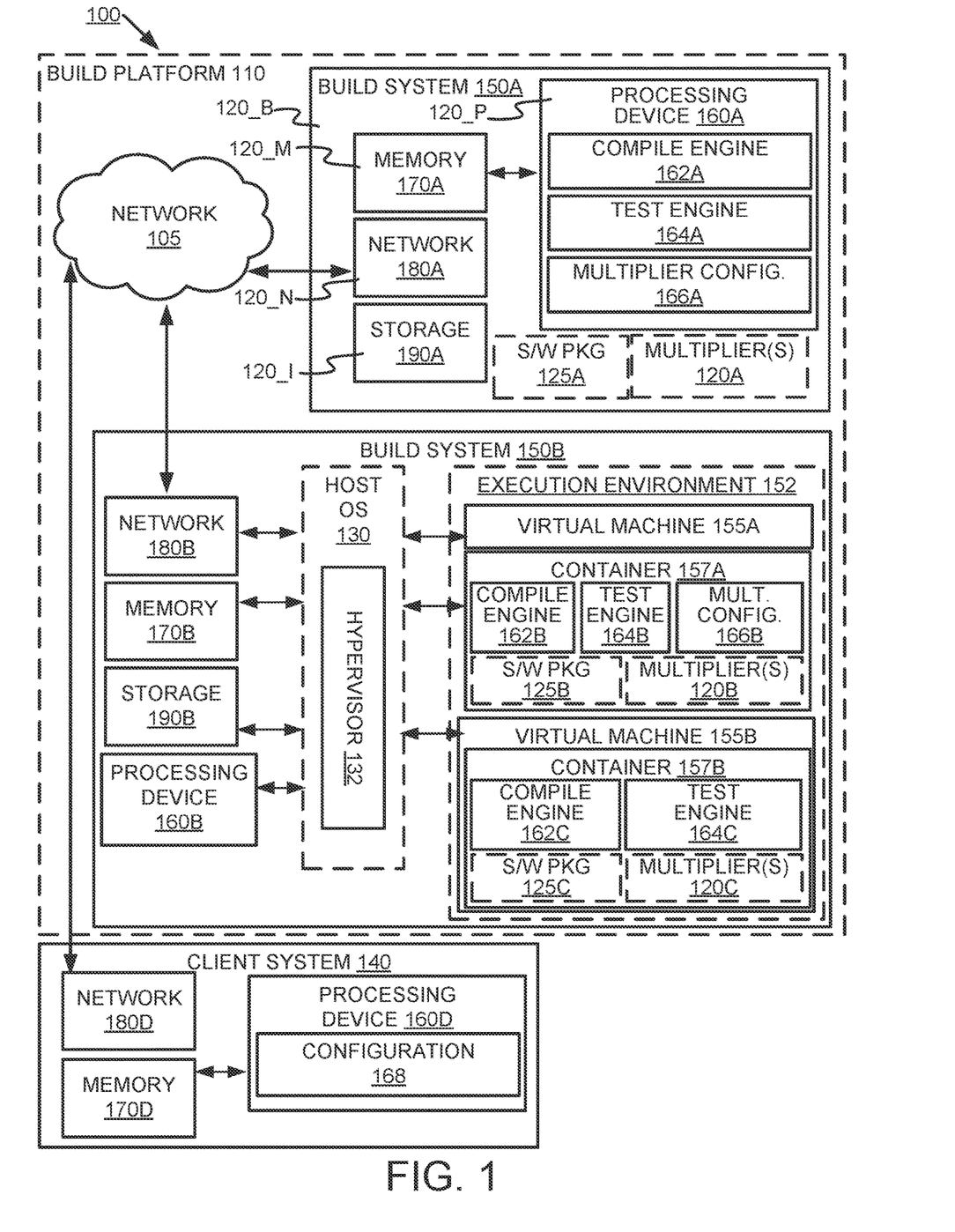
FIG. 1 depicts a high-level component diagram of an illustrative example of a build architecture, in accordance with one or more aspects of the present disclosure.

FIG. 1 depicts a high-level component diagram of an illustrative example of a build architecture 100, in accordance with one or more aspects of the present disclosure. The build architecture 100 of FIG. 1 is merely an example, and the implementation of a computer system utilizing examples of the disclosure are not necessarily limited to the specific architecture depicted by FIG. 1.

As shown in FIG. 1, build architecture 100 includes a plurality of computing devices, including a client system 140 and a plurality of build systems 150. For convenience of description, only two build systems 150, a first build system 150A and a second build system 150B, are illustrated, but it will be understood that additional build systems 150 may be present without deviating from the scope of the present disclosure.

FIG. 1 and the other figures may use like reference numerals to identify like elements. A letter after a reference numeral, such as "150A," indicates that the text refers specifically to the element having that particular reference numeral. A reference numeral in the text without a following letter, such as "150," refers to any or all of the elements in the figures bearing that reference numeral.

The client system 140 and build systems 150 include one or more processing devices 160, memory 170, which may include volatile memory devices (e.g., random access memory (RAM)), non-volatile memory devices (e.g., flash memory) and/or other types of memory devices, one or more network interfaces 180, and storage 190. In certain implementations, memory 170 may be non-uniform access (NUMA), such that memory access time depends on the memory location relative to processing device 160. It should be noted that although, for simplicity, a single processing device 160 is depicted in each of the client system 140 and build systems 150 depicted in FIG. 1, other embodiments of client system 140 and build systems 150 may include multiple processing devices 160, network interfaces 180, storage devices 190, or other devices.

Processing device 160 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 160 may also include one or more special-purpose processing devices such as an application specific integrated circuit (ASIC), a field programmable gate array (FPGA), a digital signal processor (DSP), network processor, or the like. Different ones of the client system 140 and build systems 150 may have different types of processing device 160.

The storage 190 may include removable and/or fixed non-volatile storage devices such as, but not limited to, a hard disk drive, flash memory, and/or like devices. The storage 190 may store, for example, data and/or computer instructions associated with the build architecture 100. Different ones of the client system 140 and build systems 150 may have different types of storage 190.

The client system 140 and build systems 150 may be a server, a mainframe, a workstation, a personal computer (PC), a mobile phone, a palm-sized computing device, a virtual instance of a computing device, etc. For clarity, some components of the client system 140 and build systems 150 are not shown.

In some embodiments, one or more of the build systems 150 (e.g., second build system 150B) may additionally include host operating system (OS) 130 and execution environment 152, which may include one or more virtual machines (VMs) 155, containers 157, and/or containers 157 residing within virtual machines 155. For example, FIG. 1 illustrates that the second build system 150B includes an execution environment 152 having a first virtual machine 155A, a first container 157A, and a second container 157B residing within a second virtual machine 155B. VM 155A and VM 155B are software implementations of machines that execute programs as though they were actual physical machines. Container 157 acts as an isolated execution environment for different workloads. Host OS 130 manages the hardware resources of the computer system and provides functions such as inter-process communication, scheduling, memory management, and so forth.

In FIG. 1, the second build system 150B is illustrated as hosting two virtual machines 155A, 155B, but this is merely an example and is not intended to limit the scope of the present disclosure. In some embodiments, the second build system 150B (or any of the build system 150) may only have a single VM 155, or may have more than two VMs 155.

Host OS 130 may include a hypervisor 132 (which may also be known as a virtual machine monitor (VMM)), which provides a virtual operating platform for VMs 155A, 155B and manages their execution. Hypervisor 132 may manage system resources, including access to physical processing devices 160 (e.g., processors, CPUs, etc.), physical memory 170 (e.g., RAM), storage devices 190 (e.g., HDDs, SSDs), network interfaces 180 (e.g., wired/wireless network circuit), and/or other devices (e.g., sound cards, video cards, etc.). The hypervisor 132, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 132 may present other software (i.e., "guest" software) the abstraction of one or more VMs 155 that provide the same or different abstractions to various guest software (e.g., guest operating system, guest applications). It should be noted that in some alternative implementations, hypervisor 132 may be external to host OS 130, rather than embedded within host OS 130, or may replace host OS 130.

In some embodiments, the client system 140 and the build systems 150 may be directly or indirectly communicatively coupled through one or more of the network interfaces. For example, the client system 140 and one or more of the build systems 150 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WIFI© hotspot connected with the network 105 and/or a wireless carrier system that can be implemented using various data processing equipment, communication towers (e.g., cell towers), etc. The network 105 may carry communications (e.g., data, message, packets, frames, etc.) between the various components of the client system 140 and one or more of the build systems 150.

The client system 140 and the build systems 150 may include a plurality of network interfaces 180. The network interfaces 180 may communicate with a plurality of network types. The variety of network interfaces 180 may allow for various configurations of network connectivity between the client system 140 and the build systems 150 and/or between the build systems 150.

The client system 140, the first build system 150A, the second build system 150B, and the network connections therebetween may form the build platform 110. The build platform 110 may perform compile operations and/or test operations on software packages 125. Though client system 140 is shown outside a perimeter of the build platform 110 in FIG. 1, this is only schematic and not intended to limit the embodiments of the present disclosure.

For example, the first build system 150A may perform a compile operation on a first software package 125A. In some embodiments, the compile operation may be performed by a first compile engine 162A. The compile operation may convert the first software package 125A into executable code (e.g., from source code).

As described herein, the second build system 150B illustrates an environment in which the build system 150 contains one or more virtual machines 155. For example, the second build system 150B is illustrated as hosting two VMS 155A, 155B. In some embodiments, the first VM 155A of the second build system 150B may perform a compile operation using a second compile engine 162B on a second software package 125B. In some embodiments, the second VM 155B of the second build system 150B may perform a compile operation using a third compile engine 162C on a third software package 125C.

The compile operation and/or first compile engine 162A of the first build system 150A may be the same or different from the compile operation of the second and/or third compile engines 162B, 162C of the second build system 150B. For example, in some embodiments, the first compile engine 162A may be compatible with a first architecture while the second compile engine 162B may be compatible with a second architecture and the third compile engine 162C may be compatible with a third architecture. Thus, the first build system 150A may generate the first software package 125A to be compatible with the first architecture while the second build system 150B may generate the second and third software packages 125B, 125C to be compatible with the second and third architectures, respectively. In some embodiments, the compile engine 162 may be configured to generate a software package 125 that is compatible with an architecture that is different from the native processing device 160 of the build system 150. For example, the processing device 160B of the second build system 150B may be compatible with an INTEL-based architecture, while the second and third compile engines 162B, 162C may be capable of generating second and third software packages 125B, 125C that are compatible with other architectures, such as ARM or POWERPC.

After the compile operation, the first build system 150A may perform a test operation on the compiled first software package 125A. In some embodiments, the test operation may be performed by a first test engine 164A. The test operation may perform a plurality of operations against or using the first software package 125A. The test operation may be configured to exercise portions of the first software package 125A to verify the operation of the first software package 125A. The VMs 155 of the second build system 150B may similarly perform a test operation using second and third test engines 164B, 164C on the second and third software packages 125B, 125C, respectively. The test operation and/or first test engine 164A of the first build system 150A may be the same or different from the test operations, the second test engine 164B, and/or the third test engine 164C of the second build system 150B.

The client system 140 may control and/or manage the build operations of the build systems 150. For example, the client system 140 may provide a configuration 168 to the first build system 150A and/or the second build system 150B (or individually to the VMs 155 of the second build system 150B). The configuration 168 may control the compile engine 162 and/or the test engine 164 of the build systems 150. For example, the configuration 168 may indicate which build systems 150 are to build which software packages 125. The client system 140 may also maintain status of the various operations of the build platform 110. For example, the client system 140 may monitor a success or failure of the compile engine 162 and/or the test engine 164 of the build systems 150.

A multiplier configuration component 166 may generate, receive, and/or store one or more multipliers 120. The build systems 150 may utilize the one or more multipliers 120 to perform build operations (e.g., operations performed by the compile engine 162 and/or the test engine 164). The multiplier 120 may reflect a performance of the build system 150 and/or an operating environment of the build system 150. In some embodiments, the multipliers 120 may be numerically based, with higher numbers representing higher performance and lower numbers representing lower performance.

In some embodiments, the multiplier 120 may be utilized in view of a reference machine. For example, a build system 150 that performs similarly to a reference machine may be given a multiplier 120 having a value of 1, a build system 150 that performs slower than the reference machine may be given a multiplier 120 having a value of greater than 1 (e.g., 1.5), and a build system 150 that performs faster than the reference machine may be given a multiplier 120 having a value of less than 1 (e.g., 0.75). The above numerical ranges are merely examples and are not intended to limit the scope of the present disclosure. In some embodiments, the multipliers 120 may utilize numerical values in which lower numbers (e.g., 0.75) represent lower performance vs. higher number (e.g., 1.5). In some embodiments, some number other than 1 may be used as the reference number. In some embodiments, the multiplier 120 may not be numerical. For example, in some embodiments, the multiplier 120 may be one of a finite number of values (e.g., "low," "medium," "high," etc.) or in some other format.

The multiplier 120 may be used to alter and/or adjust a build operation of the build system 150. For example, the build system 150 may execute one or more build operations that may rely on time durations for execution and/or error detection. For example, in some embodiments, the compile engine 162 and/or test engine 164 may execute a build operation that has a timeout duration associated therewith. For example, the compile engine 162 and/or test engine 164 may execute the build operation and wait for a duration equal to or exceeding the timeout duration before flagging an error. As an example, the test engine 164 may begin execution of a test utilizing the software package 125 generated by the compile engine 162. The test engine 164 may monitor the execution of the test and, if the test has not completed execution of the test within the timeout duration, end the test and flag an error.

As another example, the test engine 164 may associate a timeout duration with a start-up or shut-down of a service associated with a build operation of the test engine 164 and/or the software package 125. For example, the test engine 164 may begin a service and wait for a time equal to or exceeding the timeout duration before executing tests against the service.

In both of the above examples, without further modification the test engine 164 may generate an error if the build system 150 is executing more slowly than expected. For example, if an emulation status of the build system 150 indicates that the build system 150 is an emulated system, such as a system running a virtual machine 155, it may run more slowly (e.g., as a result of the additional infrastructure supporting the virtual machine 155). In these cases, a generic timeout duration may not be sufficient. As an example, if the timeout duration is associated with the start-up or shut-down of a service associated with the software package 125, the testing may begin before the service has adequate time to set up its operations, despite the fact that the timeout duration has passed.

The multiplier 120 may be used by infrastructure and/or users of the build platform 110 to adjust the timeout duration to scale with the performance of the build system 150. For example, if the modifier 120 is numeric, the test engine 164 may modify the timeout similarly to the following:

$$timeout = timeout * multiplier$$

In the above example, if the multiplier 120 has a value of 1 for a reference system, then the timeout value remains unchanged. If the multiplier 120 has a value that is less than one for a higher-performing system, then the timeout will be reduced. If the multiplier 120 has a value that is greater than one for a higher-performing system, then the timeout will be increased. Thus, the amount of time that a build operation will wait will be increased for a slower system, decreased for a faster system, and/or unchanged for a system that performs similarly to a reference system.

It will be understood that the above example is not intended to limit the scope of the present disclosure. In some embodiments, the multiplier 120 may be limited to have a value that is one or greater. That is, the multiplier 120 may be limited to increasing the associated timeout value, but not decreasing it. In some embodiments, the multiplier 120 may describe an overall performance of the build system 150. That is, the multiplier 120 may be a platform-based multiplier 120_B. The platform-based multiplier 120_B is illustrated schematically in FIG. 1. The platform-based multiplier 120_B may indicate a level of general performance (e.g., an overall or average speed) of the build system 150.

The embodiments of the present disclosure are not limited to a single multiplier 120. In some embodiments, the multiplier 120 may be or include a plurality of multipliers 120. For example, instead of, or in addition to, a platform multiplier 120_B, one or more subsystem multipliers 120 may be generated. In some embodiments, the subsystem multipliers 120 may include a processing device multiplier 120_P, a memory multiplier 120_M, an I/O multiplier 120_I, and/or a network multiplier 120_N, each illustrated schematically and only for example purposes in FIG. 1.

The processing device multiplier 120_P may reflect a performance of the processing device subsystem (e.g., processing device 160) of the build system 150. For example, the processing device multiplier 120_P may be based on an architecture, a processing speed, and/or a cache size of the processing device 160, though the embodiments of the present disclosure are not limited thereto. In some embodiments, the processing device multiplier 120_P may be at least partially based on whether the build operations (e.g., operations of the compile engine 162 and/or the test engine 164) are being executed on an emulated processor (e.g., on a processor of a VM 155). Stated another way, if an emulation status of the build system 150 indicates that the build operations are being executed on a VM 155, the processing device multiplier 120_P may be increased. In some embodiments, when executing in the environment of a VM 155, the processing device multiplier 120_P may refer to a performance of a virtual processor of the VM 155.

The memory multiplier 120_M may reflect a performance of the memory subsystem (e.g. memory 170) of the build system 150. For example, the memory multiplier 120_M may be based on an architecture, a read/write speed, and/or a size (e.g., memory storage size) of the memory 170, though the embodiments of the present disclosure are not limited thereto. In some embodiments, the memory multiplier 120_M may be at least partially based on whether the build operations (e.g., operations of the compile engine 162 and/or the test engine 164) are being executed as part of a VM 155. In some embodiments, when executing in the environment of a VM 155, the memory multiplier 120_M may refer to a performance of a virtual memory exposed by the VM 155.

The I/O multiplier 120_I may reflect a performance of the I/O subsystem, such as the storage 190, of the build system 150. For example, the I/O multiplier 120_I may be based on an architecture (e.g., a type of the storage 190, such as SSD and/or RAID configuration), a read/write speed, whether the I/O is local or remote (e.g., mounted over a network), and/or a cache architecture of the storage 190, though the embodiments of the present disclosure are not limited thereto. In some embodiments, the I/O multiplier 120_I may be at least partially based on whether the build operations (e.g., operations of the compile engine 162 and/or the test engine 164) are being executed as part of a VM 155. In some embodiments, when executing in the environment of a VM 155, the I/O multiplier 120_I may refer to a performance of one or more I/O devices (which may be virtual or physical) exposed by the VM 155.

The network multiplier 120_N may reflect a performance of the network subsystem (e.g., network 180) of the build system 150. For example, the network multiplier 120_N may be based on a type of the network interface 180 (e.g., wired vs. wireless, the underlying network protocol used) and/or a speed of the network interface 180 (e.g., 100 Mb vs. 1 Gb), though the embodiments of the present disclosure are not limited thereto. In some embodiments, the network multiplier 120_N may be at least partially based on whether the build operations (e.g., operations of the compile engine 162 and/or the test engine 164) are being executed as part of a VM 155. In some embodiments, when executing in the environment of a VM 155, the network multiplier 120_N may refer to a performance of one or more network devices (which may be virtual or physical) exposed by the VM 155.

The above examples of multipliers 120 are merely examples, and are not intended to limit the present disclosure. One of ordinary skill in the art will recognize that other types of multipliers 120 may be provided within the build platform 110 without deviating from embodiments of the present disclosure. For example, in some embodiments of the present disclosure, multipliers 120 may be provided for any type of specialized hardware and/or software present on the build system 150 that may be utilized to provide functionality to provide build operations (e.g., via the compile engine 162 and/or test engine 164) for the build system 150.

The platform-based multiplier 120_B may reflect an average performance of the build system 150. As with the subsystem multipliers 120 (e.g., the processing device multiplier 120_P, the memory multiplier 120_M, the I/O multiplier 120_I, and/or the network multiplier 120_N), the platform-based multiplier 120_B may be at least partially based on whether the build operations (e.g., operations of the compile engine 162 and/or the test engine 164) are being executed as part of a VM 155. In some embodiments, the platform-based multiplier 120_B may be independent of one or more of the processing device multiplier 120_P, memory multiplier 120_M, I/O multiplier 120_I, and/or network multiplier 120_N, though the embodiments of the present disclosure are not limited thereto. In some embodiments, the platform-based multiplier 120_B may be based on one or more of the subsystem multipliers 120 (e.g., the processing device multiplier 120_P, the memory multiplier 120_M, the I/O multiplier 120_I, and/or the network multiplier 120_N). For example, in some embodiments, the platform-based multiplier 120_B may be based on the highest (or lowest) of the subsystem multipliers 120. In some embodiments, the platform-based multiplier 120_B may be based on an average of the subsystem multipliers 120. In some embodiments, individual ones of the subsystem multipliers 120 may be weighted to form the average of the subsystem multipliers 120.

In some embodiments, the multipliers 120 may be automatically (e.g., without any additional input from a user) determined by the multiplier configuration component 166. For example, the multiplier configuration component may generate the multiplier 120 based on one or more benchmark programs executed on the build system 120. In some embodiments, the platform-based multiplier 120_B may be based on an average or a general benchmark score of the benchmark programs. In some embodiments, the platform-based multiplier 120_B may be based on a duration of one or more of the build operations. For example, the platform-based multiplier 120_B may be based on a duration taken by the compile engine 162 to compile the software package 125.

In some embodiments, the subsystem multipliers 120 (e.g., the processing device multiplier 120_P, the memory multiplier 120_M, the I/O multiplier 120_I, and/or the network multiplier 120_N) may be generated based one or more of a plurality of benchmark programs. For example, a benchmark program that is specialized for processor operations may be used to generate the processing device multiplier 120_P, a benchmark program that is specialized for memory operations may be used to generate the memory multiplier 120_M, a benchmark program that is specialized for I/O operations may be used to generate the I/O multiplier 120_I, and/or a benchmark program that is specialized for network operations may be used to generate the network multiplier 120_N. In some embodiments, the multiplier configuration component 166 may scan results from the benchmark programs to generate the respective multipliers 120.

In some embodiments, the multipliers 120 may be based on inventory scan of the build system 150 analyzed by the multiplier configuration component 166. For example, the multiplier configuration component 166 may execute one or more administrative programs to probe an inventory of the build system 150 to determine devices that are present and their respective architectures. As an example, the multiplier configuration component 166 may scan or analyze a scan of an I/O bus to determine a type, size, and/or speed of attached I/O devices. Similar scans may be performed for memory 170, processing devices 160, network interface 180, and/or other subsystems of the build system 150.

In some embodiments, the multipliers 120 may be based on a comparison to a reference system. For example, the generated benchmarks and/or inventory scans may be compared to a "normal" or representative reference build system 150. In some embodiments, the comparison may be automatically determined based on a normalization that may be performed with respect to the reference system. For example, if a particular benchmark on a reference system takes 100s, and the same benchmark on the build system 150 takes 150s, then the platform multiplier 120_B may be determined by a ratio of the two (e.g., 150/100, or 1.5). The above calculation is merely provided as an example and is not intended to limit the present disclosure. As will be understood by one of ordinary skill in the art, a comparison between a measurement of a reference system and a measurement of a build system 150 may be accomplished in a number of ways. In some embodiments, the measurements of the reference system to which the build system 150 are compared may be dynamically retrieved (e.g., via network 105). This may allow the comparative performance of the reference system to adjust as architectures and systems become more powerful over time.

In some embodiments, one or more of the multipliers 120 may be provided directly to the multiplier configuration component 166. For example, client system 140 may provide one or more multipliers 120 (e.g., as part of configuration 168) to be used for the build operations. In some embodiments, the multiplier configuration component 166 may first determine if defined multipliers 120 have been provided before dynamically generating multipliers 120 through benchmarking or other means.

As described herein, the multiplier 120 may be utilized to automatically adjust time durations (e.g., timeout values) associated with one or more build operations of a build architecture 100. The ability to dynamically adjust the time durations allows for the build process to automatically adjust to efficiencies (or deficiencies) in the build system 150 without requiring manual intervention.

Figure 2:
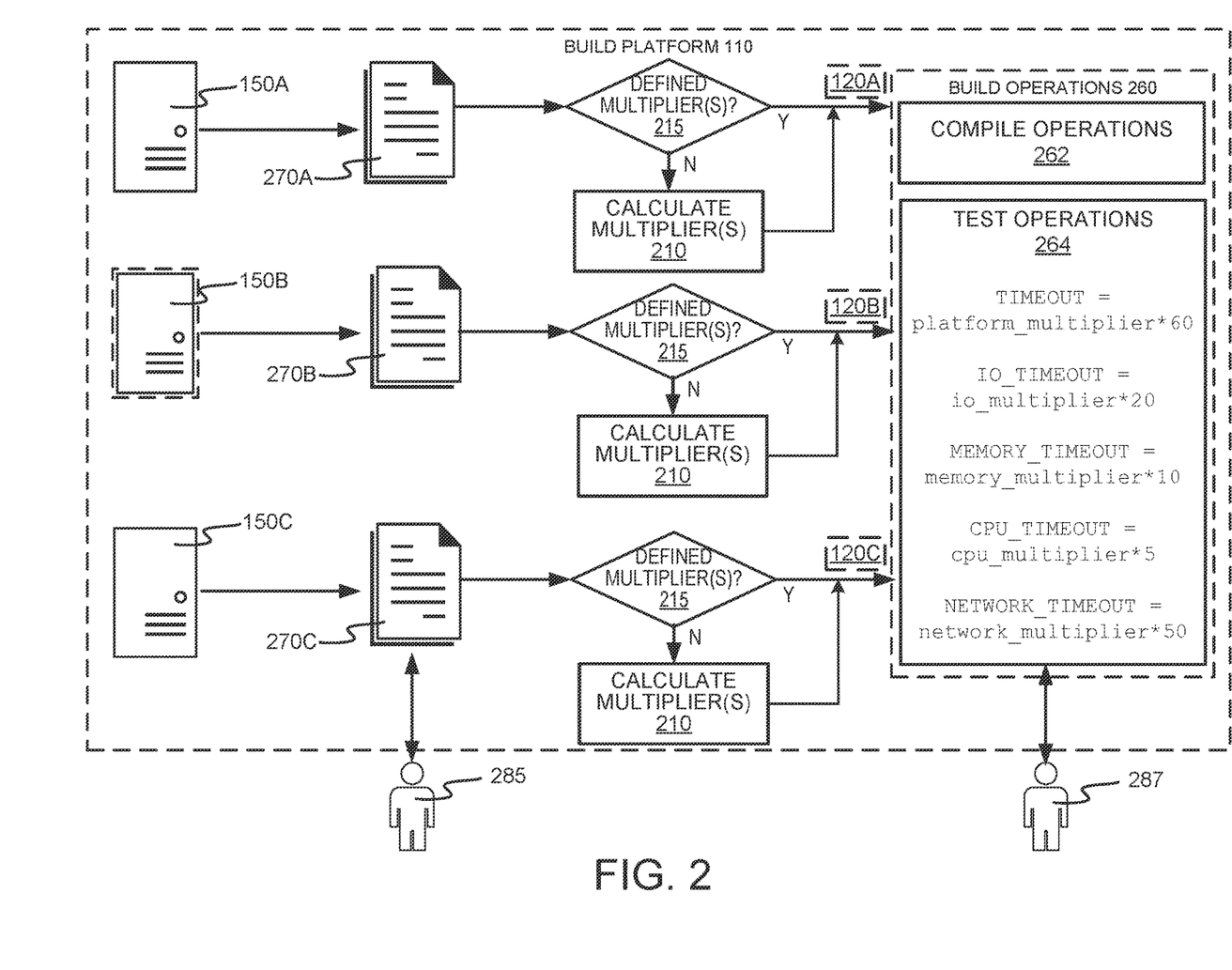
FIG. 2 is a schematic diagram illustrating an example scenario utilizing a multiplier in a build platform, in accordance with one or more aspects of the present disclosure.

FIG. 2 is a schematic diagram illustrating an example scenario utilizing a multiplier 120 in a build platform 110, in accordance with one or more aspects of the present disclosure. In FIG. 2, a plurality of build systems 150 (first build system 150A, second build system 150B, and third build system 150C) are illustrated as part of a build platform 110. In FIG. 2, second build system 150B is illustrated as being outlined with a dashed line to indicate that second build system 150B is executing as part of a virtual machine 155 (see FIG. 1).

Referring to FIGS. 1 and 2, a plurality of build operations 260 may be performed by the build systems 150. As part of the build operations 260, the build systems 150 may first analyze configuration files 270. In some embodiments, a different configuration file 270 may be provided to each of the build systems 150 (e.g., a configuration file 270A may be provided to the first build system 150A, a configuration file 270B may be provided to the second build system 150B, and/or a configuration file 270C may be provided to the third build system 150C), but the embodiments of the present disclosure are not limited thereto.

In some embodiments, the configuration file 270 may indicate one or more parameters to be used as part of the build operations 260. For example, the configuration file 270 may determine a software package 125 that is to be built and/or an architecture that is to be used for the build operations 260. In some embodiments, the configuration file 270 may specify a modifier 120 that is to be used for the build operations 260. For example, a user 285 (e.g., build administrator 285) may insert (e.g., via client system 140), one or more of the modifiers 120 within or associated with the configuration file 270.

The build system 150 may next perform (e.g., by multiplier configuration component 166 of FIG. 1) operation 215 to determine if the one or more of the multipliers 120 have been defined, e.g., as part of the configuration file 270. If the multipliers 120 are defined (operation 215:Y), those multipliers 120 will be used in build operations 260. If the multipliers 120 are not defined (operation 215:N), the multipliers 120 may be automatically determined by operation 210.

Operation 210 may automatically determine the multipliers 120 that have not been predefined. For example, as described herein with respect to FIG. 1, operation 210 may automatically determine the multipliers 120 through the use of one or more benchmarks, an observation (e.g., a time measurement) of compile operations 262 (which may be performed by compile engine 162 described with respect to FIG. 1), an inventory scan of the build system 150, or the like.

The multipliers 120 may be used as part of the build operations 260. For example, the multipliers 120 may be used as part of the compile engine 162 or test engine 164. For example, the build operations 1260 may include test operations 264 (e.g., executed by test engine 164) that incorporate one or more of the multipliers 120.

FIG. 2 illustrates some examples of various test timeouts that may be set using one or more of the multipliers 120. For example, a general timeout ("TIMEOUT") may be set based on the platform multiplier 120_B, an I/O timeout ("IO_TIMEOUT") may be set based on the I/O multiplier 120_I, a memory timeout ("MEMORY_TIMEOUT") may be set based on the memory multiplier 120_M, a processing device timeout ("CPU_TIMEOUT") may be set based on the processing device multiplier 120_P, and/or a network timeout ("NETWORK_TIMEOUT") may be set based on the network multiplier 120_N. In situations in which the first build system 150A, the second build system 150B, and the third build system 150C each have different multipliers 120, then the build operations 260 executed by each of the first, second, and third build systems 150A, 150B, 150C will utilize different timeout values. It will be understood that the embodiments illustrated in FIG. 2 are merely examples, and that other variations on setting the various timeouts may be used without deviating from the scope of the present disclosure. For example, the timeouts may use a default timeout if a multiplier 120 is not defined and adjust the timeout based on the multiplier 120 if the multiplier 120 is defined.

The adjusted timeouts may be used, for example, as part of the test operations 264. For example, the adjusted timeouts may be used to measure a timeout duration of a test performed by the test operations 264. For example, referring to FIG. 2, a memory timeout of 10 seconds may be used for a reference system (e.g., with a modifier of 1) executing a memory test. If the memory test is not completed on the reference system within 10 seconds an error is raised. According to some embodiments of the present disclosure, a build system 150 having a memory modifier 120_M of 1.5 (e.g., a build system 150 running in an emulated mode on a VM 155) may have an adjusted timeout of 15 seconds (10*1.5). A memory test running on such a build system 150 with the adjusted timeout will not raise an error until 15 seconds has passed.

As another example, an IO timeout of 20 seconds may be used for a reference system executing a test operation 264 that utilizes a web service. When executing on a reference system (e.g., with a modifier of 1), the test operation 264 may wait 20 seconds after starting a web service before beginning the performance of the underlying tests. According to some embodiments of the present disclosure, a build system 150 having an I/O modifier 120_I of 0.8 (e.g., a build system 150 running an accelerated storage 190) may wait for an adjusted duration of 16 seconds (20*0.8) before beginning the test operations 264, thus allowing less time for the system to set up the web service on the faster (as compared to the reference system) build system 150 and beginning the test operations 264 more quickly.

The multipliers 120 may be utilized in a number of different ways, as will be recognized by one of ordinary skill in the art. A user 287 of the build operations 260 may compose the test operations 264 to leverage the multipliers 120. The user 287 may be, for example, a developer of the software package 125 that is being built. The user 287 may be familiar with what portions of the test operations 264 may need to be adjusted based on the multipliers 120 and may use the multipliers 120 as needed to allow for automatic customization of the build operations 260 based on the performance of the build system 150. As the user 287 may be unable to know, in advance, a performance of the build system 150 that will be executing the build operations 260, the multipliers 120 allow for a way to automatically adjust build operations 260 that may be sensitive to the performance of the build system 150.

Figure 3:
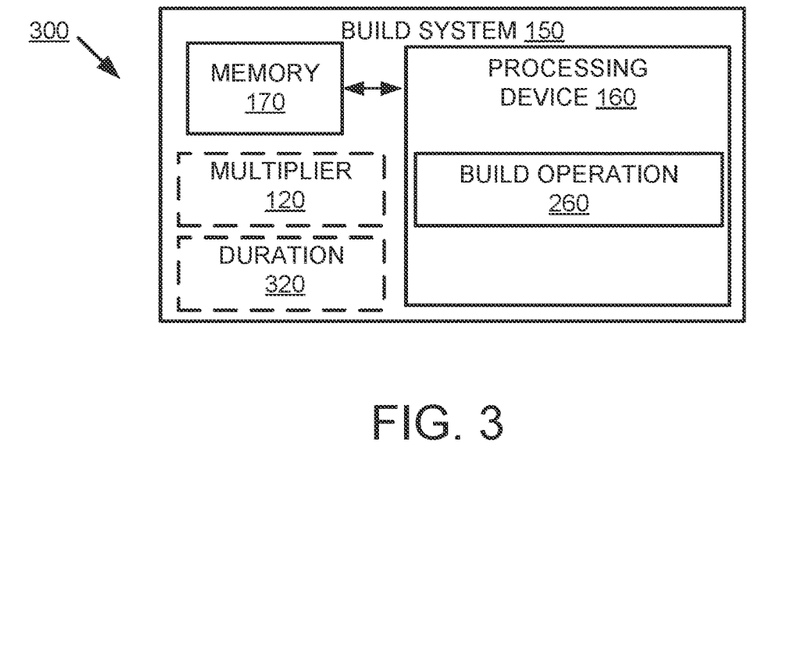
FIG. 3 is a component diagram of an example of a device architecture, in accordance with one or more aspects of the disclosure.

FIG. 3 is a component diagram of an example of a device architecture 300, in accordance with one or more aspects of the disclosure. The device architecture 300 includes a build system 150 having a processing device 160 and memory 170 as described herein with respect to FIG. 1. As such, a duplicate description thereof will be omitted.

The processing device 160 of the build system 150 may determine one or more multipliers 120 that are associated with a performance of the build system 150. The processing device 160 may determine the multipliers utilizing mechanisms described herein with respect to FIGS. 1 and 2, such as through the use of benchmarks or other timings.

The processing device 160 may utilize the multiplier 120 to adjust a duration 320. The duration 320 may be, for example, a timeout or other time duration utilized as part of a build operation 260, as described herein with respect to FIGS. 1 and 2. For example, the multiplier 120 may be used to adjust the duration 320 so as to be longer for a build system 150 that performs slower as compared to a reference system and to be shorter for a build system 150 that performs faster as compared to a reference system.

Figure 4:
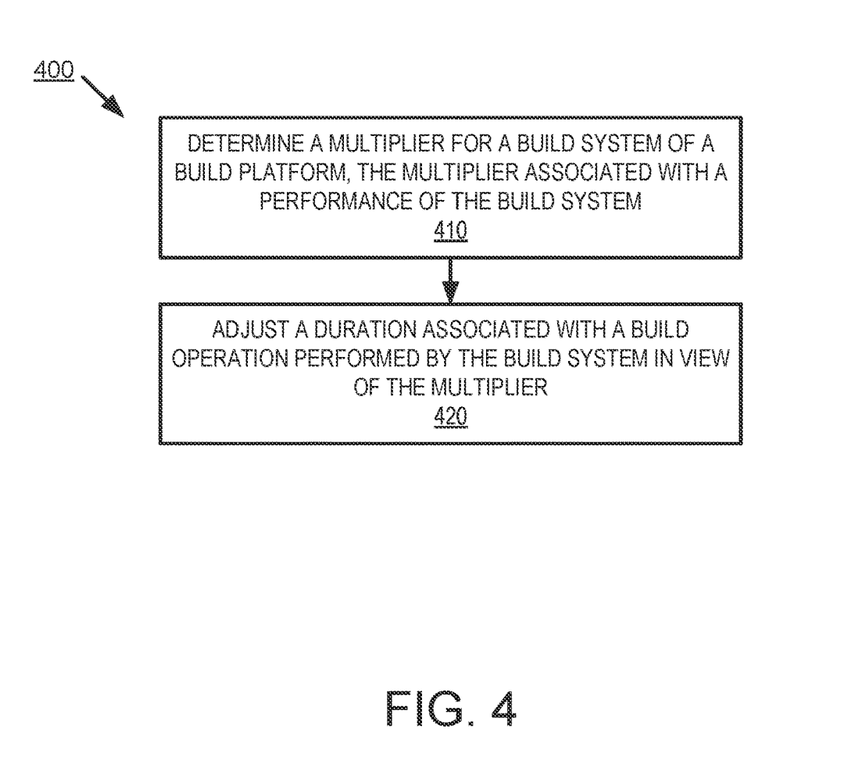
FIG. 4 is a flow diagram of a method of performing a build operation in a build platform, in accordance with one or more aspects of the disclosure.

FIG. 4 is a flow diagram of a method 400 of performing a build operation 260 in a build platform 110, in accordance with one or more aspects of the disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by the build system 150 of at least FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic determines a multiplier for a build system of a build platform. The multiplier may be associated with a performance of the build system. The multiplier and build system may be, for example, similar to the multiplier 120 and build system 150 discussed herein with respect to FIGS. 1-3.

In some embodiments, the multiplier comprises a platform multiplier that is associated with an emulation status of the build system. For example, the platform multiplier may be similar to the platform multiplier 120_B and the emulation status may reflect whether the build operations are being performed by a VM 155, as discussed herein with respect to FIGS. 1-3.

In some embodiments, the multiplier includes a subsystem multiplier that is associated with one or more subsystems of the build system. For example, the multiplier may include a processing device multiplier 120_P associated with the processing device subsystem of the build system 150, a memory multiplier 120_M associated with the memory subsystem of the build system 150, an I/O multiplier 120_I associated with an I/O subsystem of the build system 150, and/or a network multiplier 120_N associated with a network subsystem of the build system 150, as discussed herein with respect to FIGS. 1-3.

In some embodiments, determining the multiplier includes executing one or more benchmarks on the build system. For example, the benchmarks may be one or more programs (e.g., as executed by operations 210 discussed herein with respect to FIG. 2) running on the build system 150 that evaluate a performance of the build system 150 or and/one of the subsystems of the build system 150, as discussed herein with respect to FIGS. 1-3.

At block 420, the processing logic adjusts a duration associated with a build operation performed by the build system in view of the multiplier. The build operation may be, for example, similar to the build operations 260 discussed herein with respect to FIGS. 1-3. In some embodiments, the processing logic adjusts the duration dynamically (e.g., automatically and without additional user intervention).

In some embodiments, the build operation may include a test operation of a software package building on the build system. For example, the test operation may be similar to the test operations 264 (e.g., executed by the test engine 164) discussed herein with respect to FIGS. 1-3. In some embodiments, the duration is associated with a start-up or shut-down of a service associated with the test operation or the duration is associated with a timeout duration of the test operation, as discussed herein with respect to FIGS. 1-3.

Figure 5:
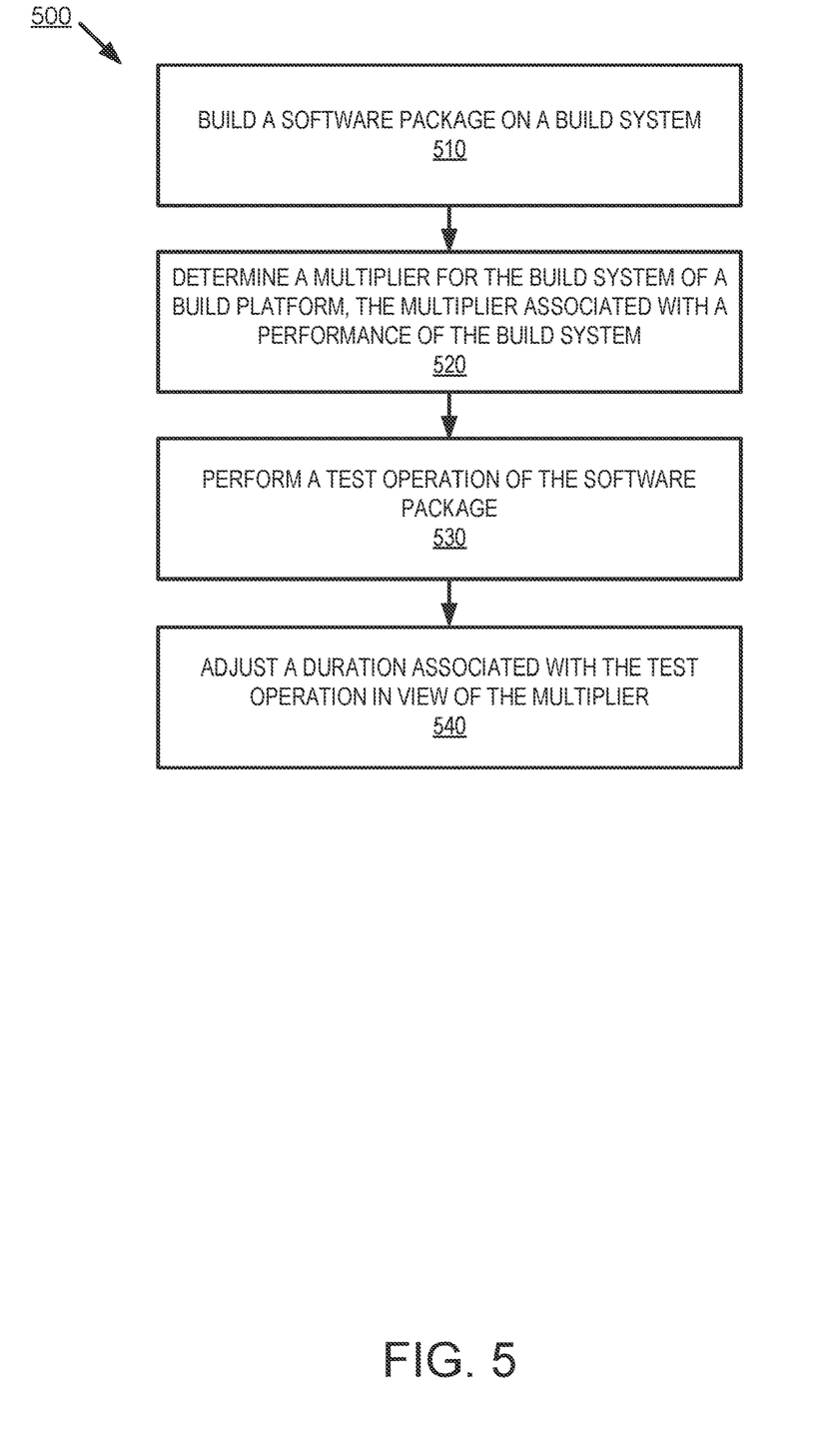
FIG. 5 is a flow diagram of a method of performing a build operation in a build platform, in accordance with one or more aspects of the disclosure.

FIG. 5 is a flow diagram of a method 500 of performing a build operation 260 in a build platform 110, in accordance with one or more aspects of the disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by the build system 150 of at least FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic builds a software package on a build system. The software package and build system may be, for example, similar to the software package 125 and build system 150 discussed herein with respect to FIGS. 1-4. In some embodiments, the build system 150 may be executing as part of a VM 155.

At block 520, the processing logic determines a multiplier for a build system of a build platform. The multiplier may be associated with a performance of the build system. The multiplier may be, for example, similar to the multiplier 120 discussed herein with respect to FIGS. 1-4.

In some embodiments, the multiplier comprises a platform multiplier that is associated with an emulation status of the build system. For example, the platform multiplier may be similar to the platform multiplier 120_B and the emulation status may reflect whether the build operations are being performed by a VM 155, as discussed herein with respect to FIGS. 1-4.

In some embodiments, the multiplier includes a subsystem multiplier that is associated with one or more subsystems of the build system. For example, the multiplier may include a processing device multiplier 120_P associated with the processing device subsystem of the build system 150, a memory multiplier 120_M associated with the memory subsystem of the build system 150, an I/O multiplier 120_I associated with an I/O subsystem of the build system 150, and a network multiplier 120N associated with a network subsystem of the build system 150, as discussed herein with respect to FIGS. 1-4.

In some embodiments, determining the multiplier includes executing one or more benchmarks on the build system. For example, the benchmarks may be one or more test programs (e.g., as executed by operations 210) running on the build system 150 that evaluate a performance of the build system 150 or one of the subsystems of the build system 150, as discussed herein with respect to FIGS. 1-4.

At block 530, the processing logic performs a test operation of the software package. For example, the test operation may be similar to the test operations 264 (e.g., executed by the test engine 164) discussed herein with respect to FIGS. 1-4.

At block 540, the processing logic adjusts a duration associated with the test operation in view of the multiplier. In some embodiments, the duration is associated with a start-up or shut-down of a service associated with the test operation or the duration is associated with a timeout duration of the test operation, as discussed herein with respect to FIGS. 1-4.

Figure 6:
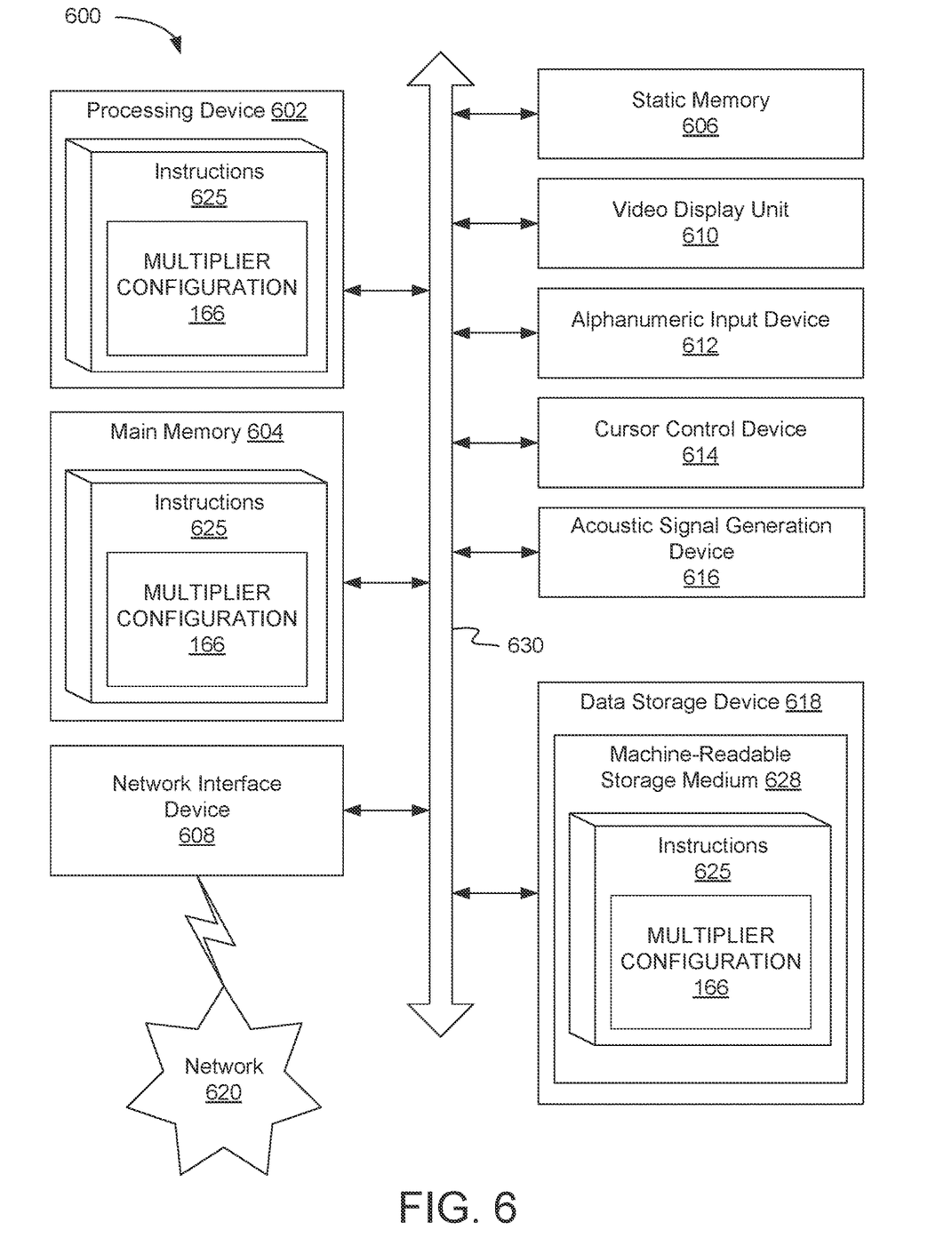
FIG. 6 is a block diagram of an example apparatus that may perform one or more of the operations described herein, in accordance with one or more aspects of the disclosure.

FIG. 6 is a block diagram of an example computing device 600 that may perform one or more of the operations described herein, in accordance with one or more aspects of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a non-volatile memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a multiplier configuration component, e.g., multiplier configuration 166 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "adjusting," "building," "executing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   determining a multiplier for a build system, the multiplier associated with a performance of the build system, wherein the multiplier comprises a platform multiplier that is associated with an emulation status of the build system, and wherein determining the multiplier comprises executing one or more benchmark programs on the build system;
   adjusting, by a processing device, a duration associated with a build operation performed by the build system in view of the multiplier; and
   performing the build operation on the build system utilizing the duration.

2. The method of claim 1, wherein the multiplier further comprises a subsystem multiplier that is associated with one or more subsystems of the build system.

3. The method of claim 2, wherein the one or more subsystems of the build system comprise one or more of a processing device subsystem, a memory subsystem, an input/output (I/O) subsystem, and a network subsystem.

4. The method of claim 1, further comprising:
   building a software package on the build system; and
   after building the software package, executing a test comprising the build operation on the software package.

5. The method of claim 1, wherein the build operation comprises a test operation of a software package building on the build system, and
   wherein the duration is associated with a start-up or shut-down of a service associated with the test operation or the duration is associated with a timeout duration of the test operation.

6. A system comprising:
   a memory; and
   a hardware processing device, operatively coupled to the memory, the processing device to:
      determine a multiplier for a build system, the multiplier associated with a performance of the build system, wherein the multiplier comprises a platform multiplier that is associated with an emulation status of the build system, and wherein to determine the multiplier the processing device is to execute one or more benchmark programs on the build system;
      adjust, by the processing device, a duration associated with a build operation performed by the build system in view of the multiplier; and
      perform the build operation on the build system utilizing the duration.

7. The system of claim 6, wherein the multiplier further comprises a subsystem multiplier that is associated with one or more subsystems of the build system.

8. The system of claim 7, wherein the one or more subsystems of the build system comprise one or more of a processing device subsystem, a memory subsystem, an input/output (I/O) subsystem, and a network subsystem.

9. The system of claim 6, wherein the processing device is further to:
build a software package on the build system; and
after building the software package, execute a test comprising the build operation on the software package.

10. The system of claim 6, wherein the build operation comprises a test operation of a software package building on the build system, and
wherein the duration is associated with a start-up or shut-down of a service associated with the test operation or the duration is associated with a timeout duration of the test operation.

11. A non-transitory computer-readable storage medium including instructions that, when executed by a processing device, cause the processing device to:
determine a multiplier for a build system, the multiplier associated with a performance of the build system, wherein the multiplier comprises a platform multiplier that is associated with an emulation status of the build system, and wherein to determine the multiplier the processing device is to execute one or more benchmark programs on the build system;
adjust, by the processing device, a duration associated with a build operation performed by the build system in view of the multiplier; and
perform the build operation on the build system utilizing the duration.

12. The non-transitory computer-readable storage medium of claim 11, wherein the multiplier further comprises a subsystem multiplier that is associated with one or more subsystems of the build system.

13. The non-transitory computer-readable storage medium of claim 11, wherein the processing device is further to:
build a software package on the build system; and
after building the software package, execute a test comprising the build operation on the software package.

14. The non-transitory computer-readable storage medium of claim 11, wherein the build operation comprises a test operation of a software package building on the build system, and
wherein the duration is associated with a start-up or shut-down of a service associated with the test operation or the duration is associated with a timeout duration of the test operation.

* * * * *